Dec. 14, 1948.   R. LAPSLEY   2,456,132
TRANSMISSION
Filed July 10, 1943   10 Sheets-Sheet 2
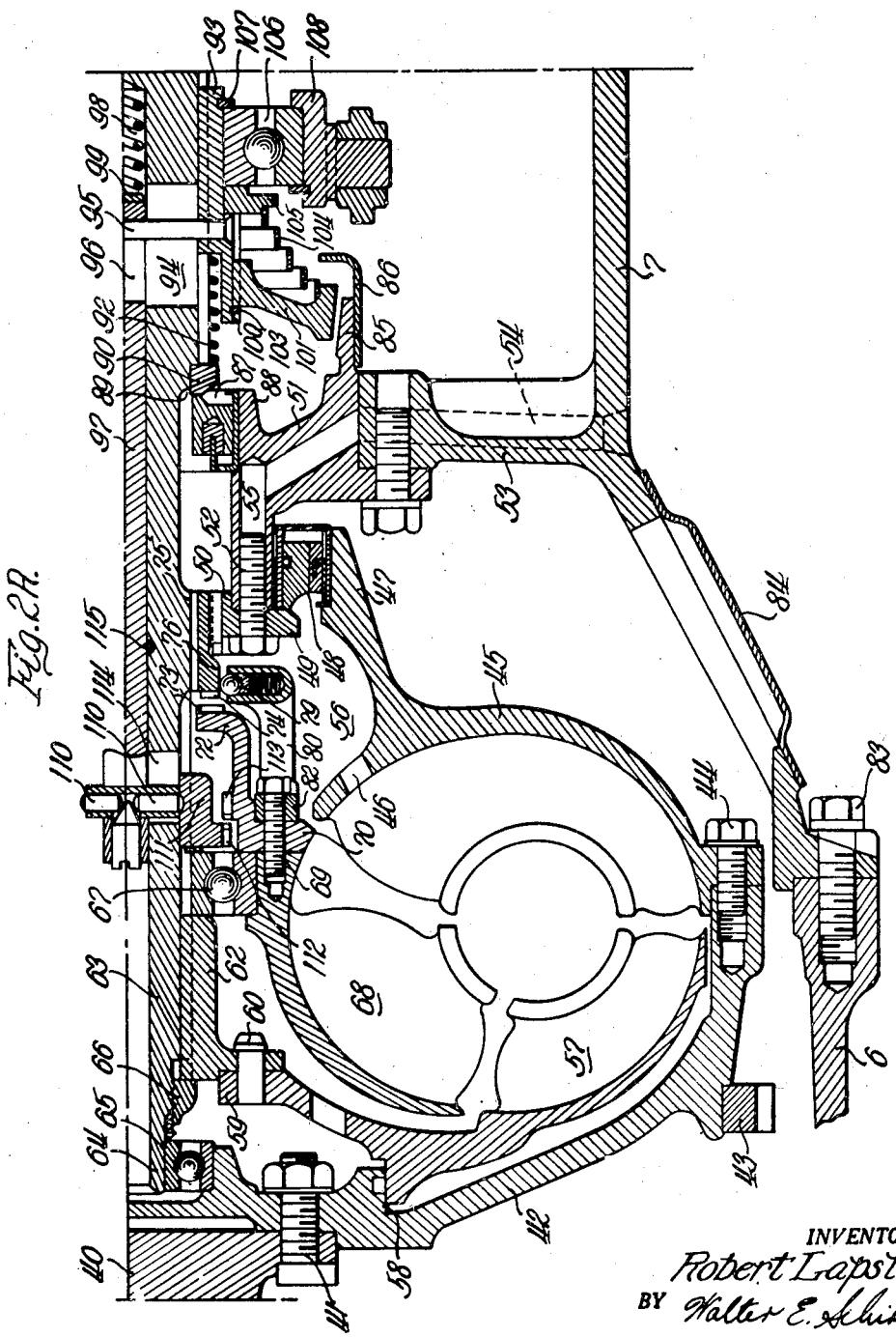
INVENTOR.
Robert Lapsley
BY Walter E. Schirmer
Atty.

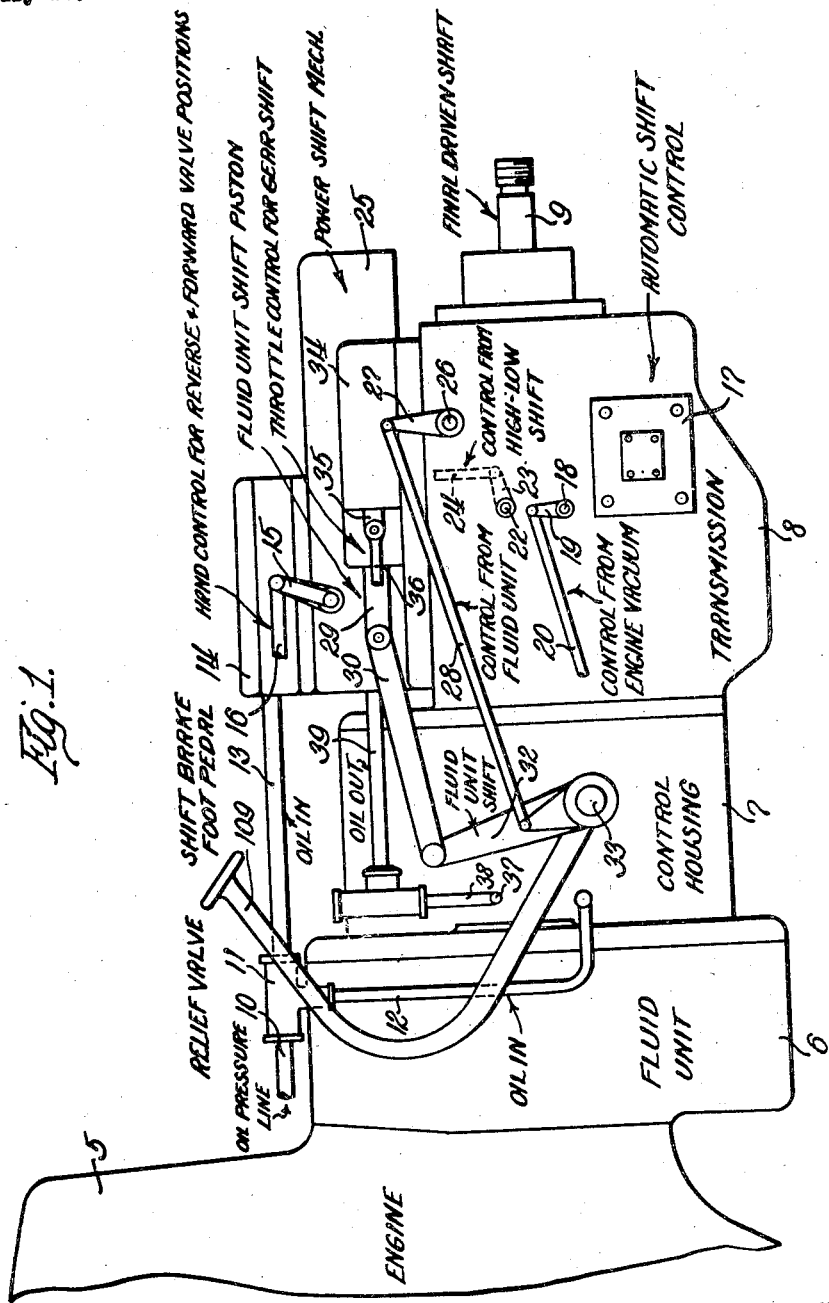

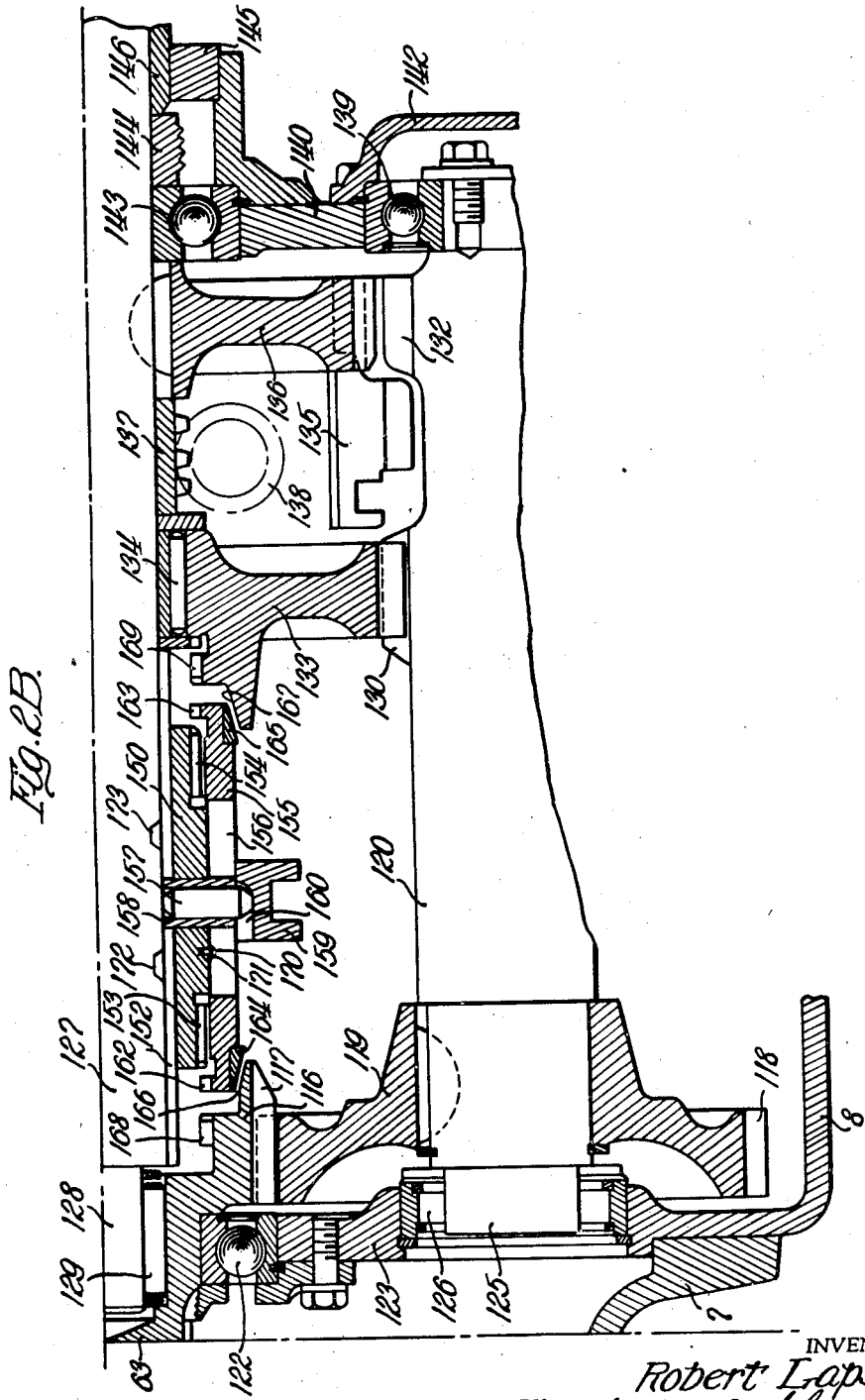

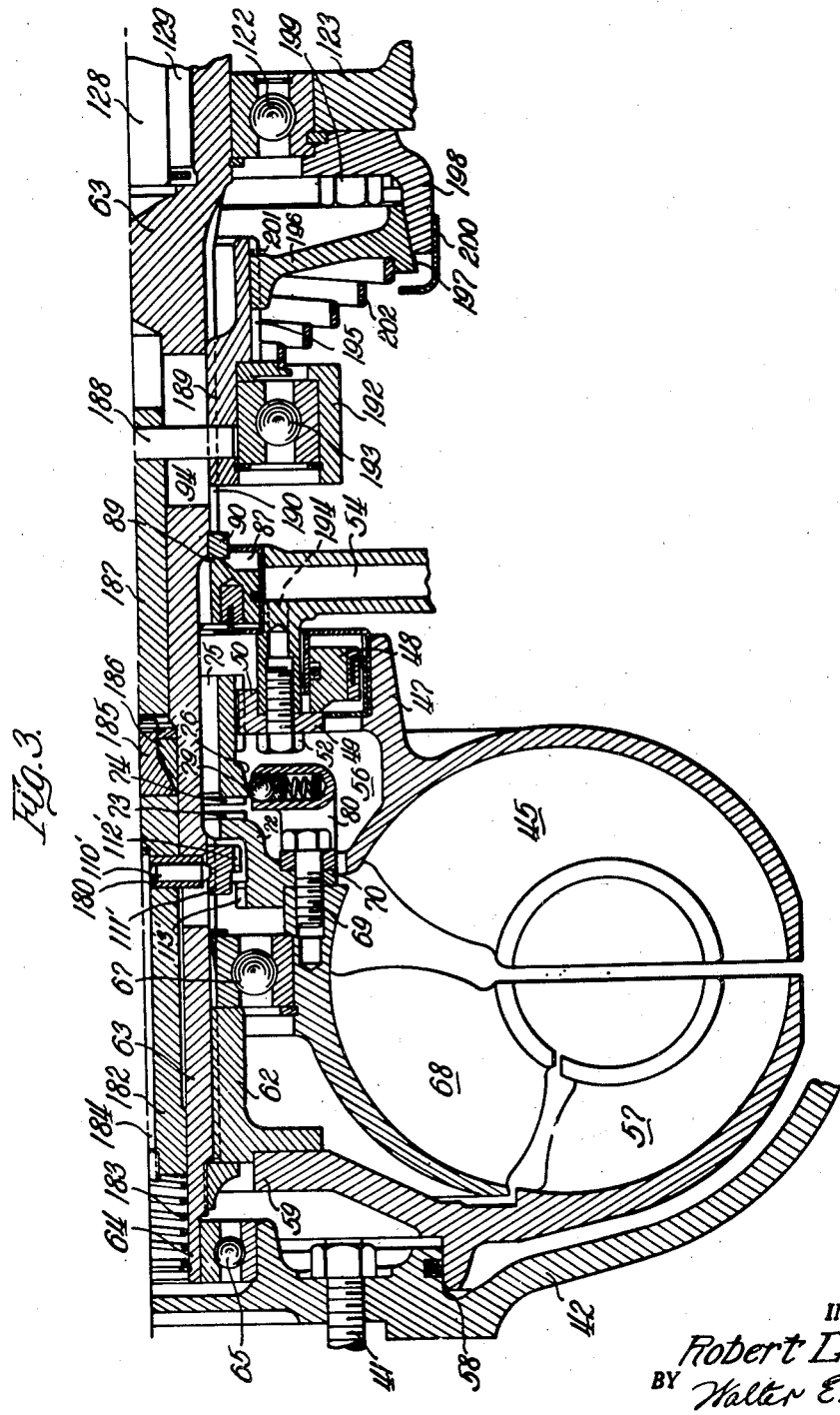

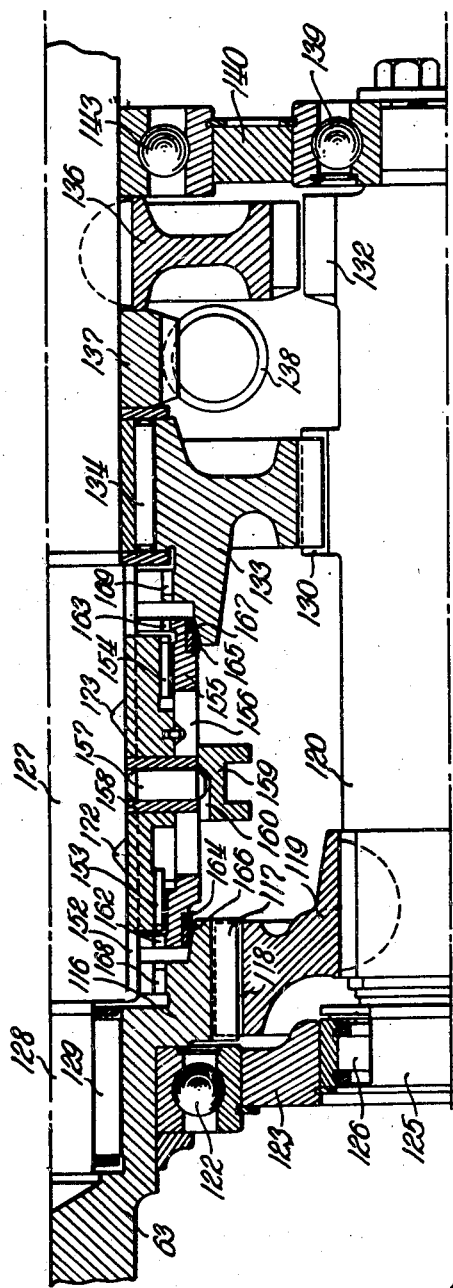

Dec. 14, 1948.  R. LAPSLEY  2,456,132
TRANSMISSION
Filed July 10, 1943  10 Sheets-Sheet 6
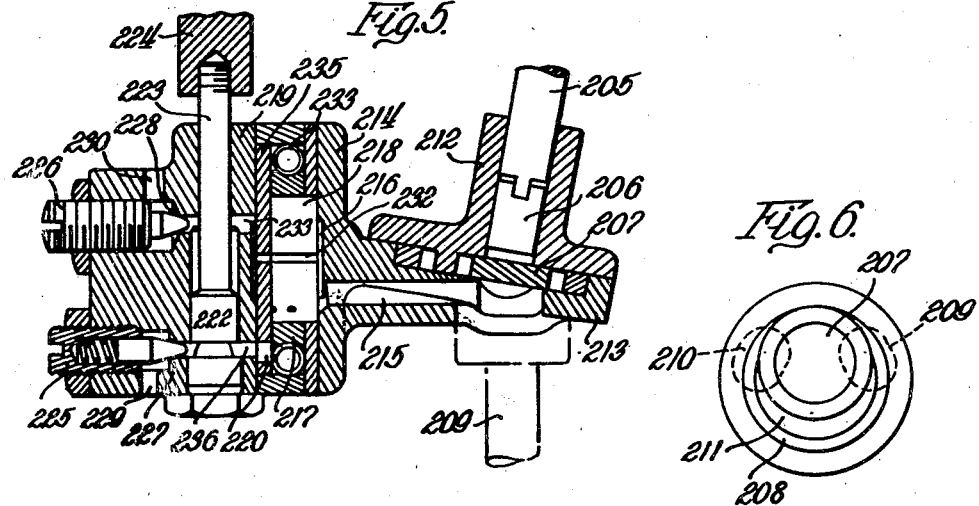
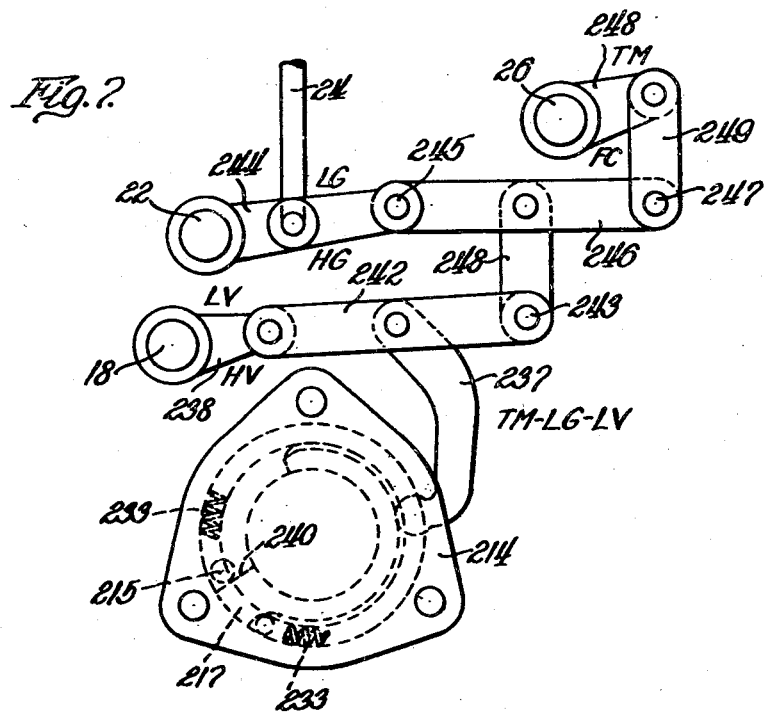
INVENTOR.
Robert Lapsley
BY

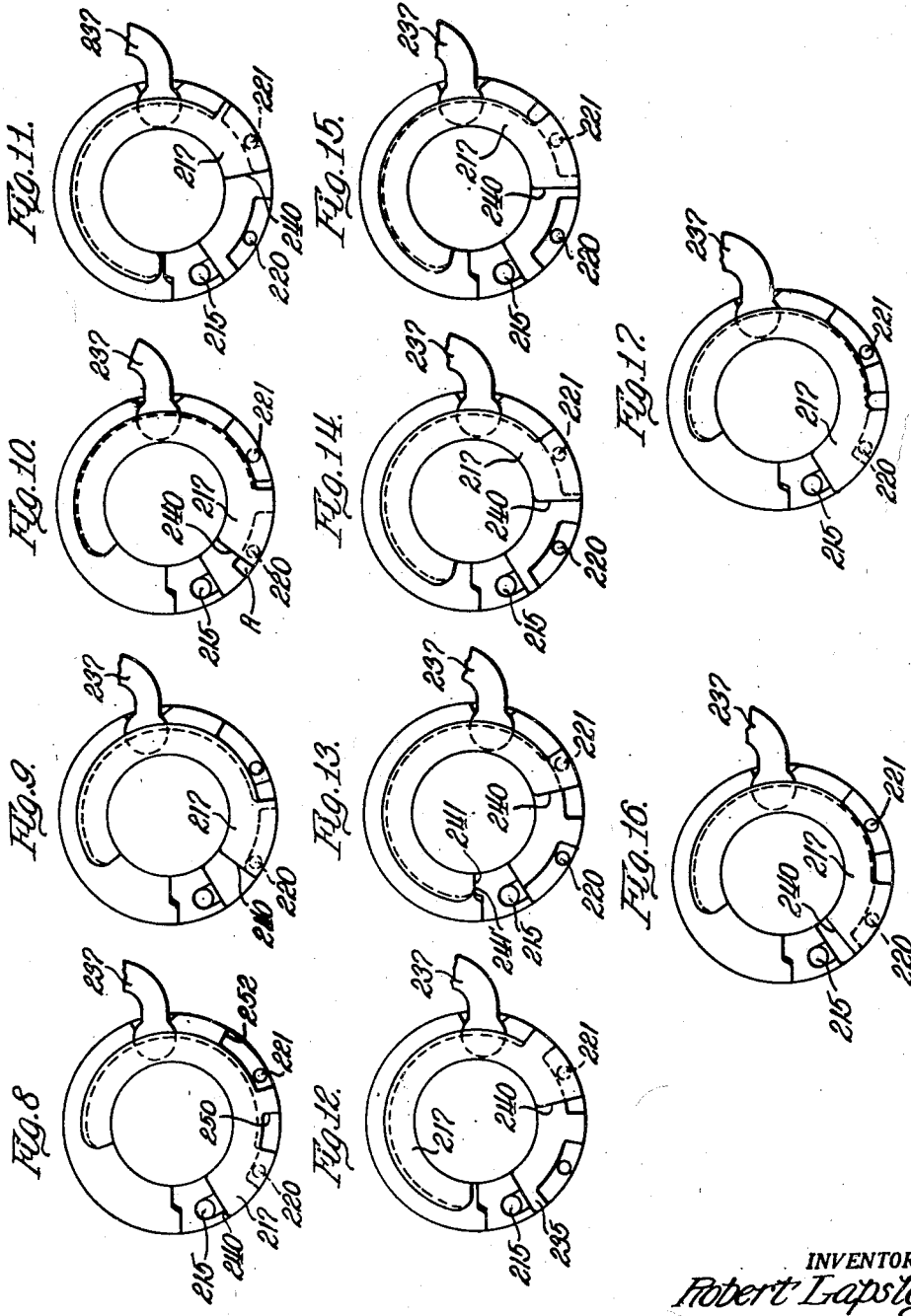

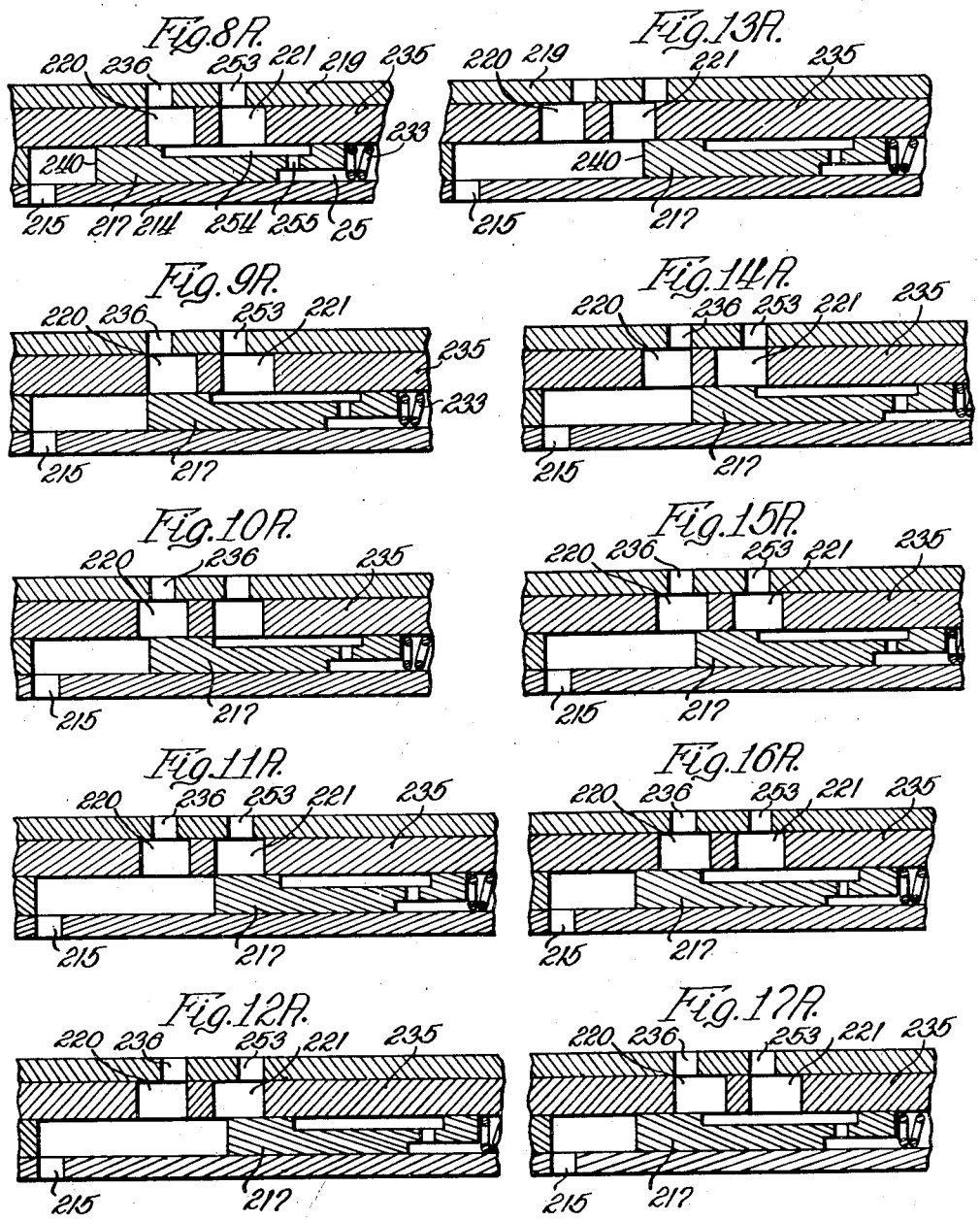

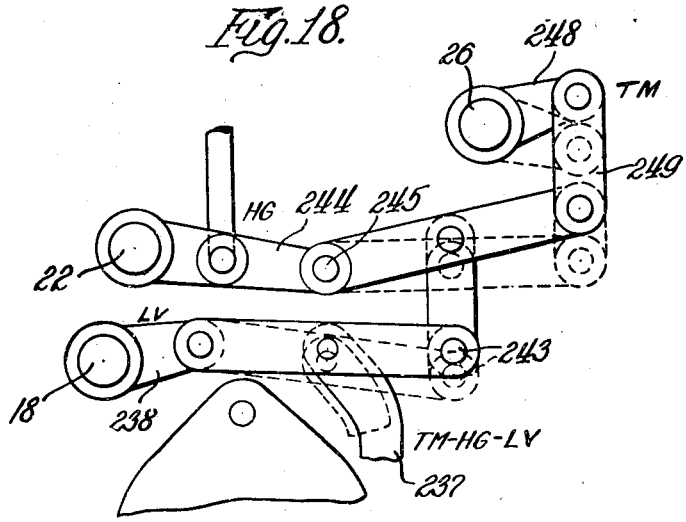
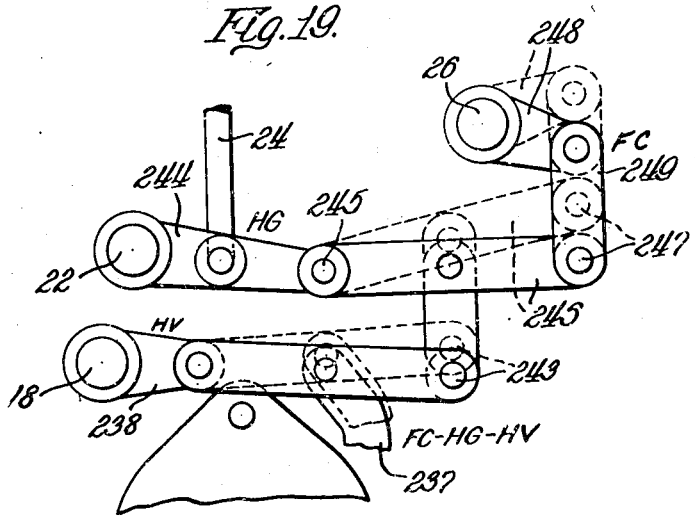

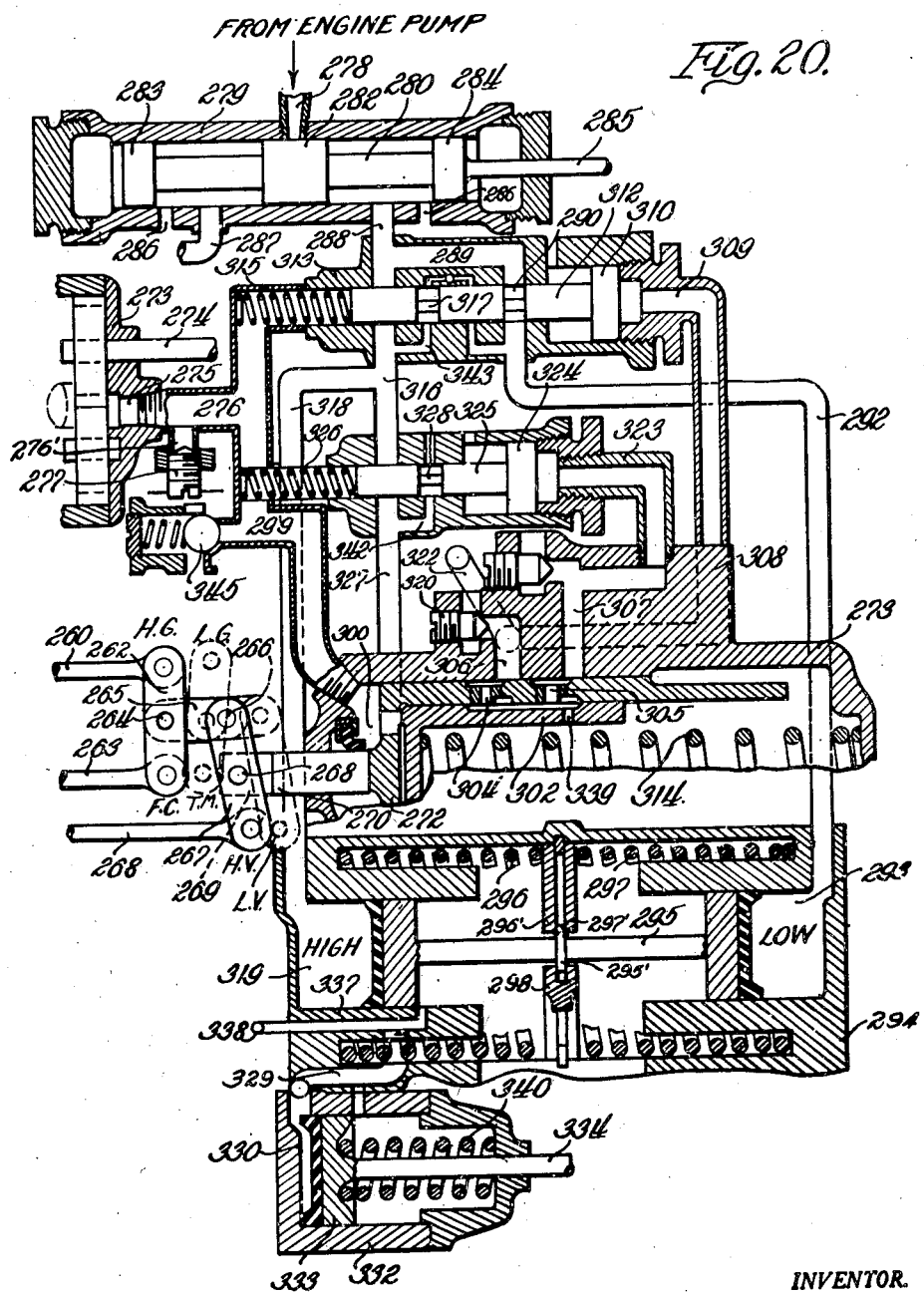

Patented Dec. 14, 1948

2,456,132

UNITED STATES PATENT OFFICE 2,456,132

TRANSMISSION

Robert Lapsley, Berrien Springs, Mich., assignor to Clark Equipment Company, Buchanan, Mich., a corporation of Michigan Application July 10, 1943, Serial No. 494,439

21 Claims. (Cl. 74—189.5)

This invention relates to transmissions, and more particularly is directed to a transmission which is automatically controlled throughout the various speed ranges.

The present invention is directed particularly to a transmission employing the combination of a fluid torque converter and a change speed gearing arrangement, the torque converter providing infinitely variable torque multiplication in each of the respective gear ratios provided by the change speed gearing. In addition, the torque converter itself is capable of being shifted into position to function as a fluid coupling under certain conditions, this shift being effected automatically in accordance with speed and power requirements of the engine.

One of the primary objects of the present invention is to provide an automatic transmission construction which is fully automatic once the direction of drive has been determined by the operator, and will function to provide the desired torque multiplication through the transmission under all operating conditions. This is accomplished by providing automatic control means functioning in accordance with the load on the engine and the speed of the vehicle for shifting from an original condition of torque multiplication through the converter with a low gear ratio in the transmission to a torque multiplication in the converter with a high gear ratio in the transmission, and thence to a fluid coupling drive through high gear of the transmission as the load requirements of the engine dictate, with automatic shifting downwardly through various stages as the load requirements of the engine increase.

One of the specific objects of the invention is to provide a power transmitting device consisting of a fluid drive which will operate as a fluid torque multiplier or fluid clutch in accordance with the control of its shift means, which shift means is automatically controlled at any time. In addition to this, the fluid drive construction is provided with means operative when the engine is idling for braking the driven shaft either to a stop, or rotating it slightly in a reverse direction so as to remove any idling torque from the driven shaft and gears, thereby allowing gear changes to be effected without restriction or clash.

Another object of the present invention is to provide a fluid unit control which is automatically operable in accordance with power requirements of the engine for locking the fluid turbine and reaction members together to prevent torque multiplication and to produce, in effect, a two-element fluid clutch, and which, upon movement of the automatic control means in the opposite direction, will operate a shift brake so as to stop rotation of the driven shaft and rotate it rearwardly to allow change speed shifts to be made without restriction or clash.

A still further object of the present invention is to provide a change-speed gear unit having a reverse speed selectable by the operation of a manual shift brake and forward speeds selectable by the initial operation of the manual shift, but which is also capable of speed changes while the vehicle is in motion without the use of the shift. This latter feature is effected by conjoint control of the engine throttle and vehicle speed through automatic control means for effecting selective movement of the speed change mechanism.

Another feature of the present invention is the provision of speed change mechanism within the transmission unit consisting of a slidable clutching unit having clutch teeth so designed as to be expelled from the faster moving gear due to driving torque and having other clutch teeth so designed as to be expelled from the slower moving gear in response to coasting torque. This unit also is provided with blocking means for preventing over-shifting of the clutching unit which might produce clashing until the engine speed is adjusted automatically to the speed of the gear with which the clutching unit is to engage. This blocking action is controlled by friction or other synchronizing mechanism carried by the blocking means, and also is provided with means for locking the clutch teeth against being expelled by torque from the engaged gear until the automatic control mechanism produces the desired changspeed in accordance with the speed and load requirements of the vehicle.

Still another feature of the present invention is the provision of a change speed control unit which selectively shifts the gears as desired and which may be operated either manually or automatically as desired. When automatic control is desired, a power shifting mechanism is provided so as to move the proper shift means as required to meet the torque requirements of the engine in accordance with changing conditions of power and speed requirements of the vehicle.

Still another feature of the present invention is the provision of an automatic control mechanism which is self-adjusting so as to make the desired change speed shifts to best meet the requirements produced by varying conditions which may be encountered by the vehicle. In this connection, the vehicle speed is gauged by a fluid pump driven by the final drive shaft of the transmission unit and the power is gauged by the rise and fall of the vacuum in the intake manifold, as sensed by the use of a vacuum piston which controls the various control valve ports. This control unit is equally applicable to use with a gasoline powered engine or a Diesel type engine.

In addition to controlling the speed change mechanism in the change speed gearing of the transmission unit and the control from the engine vacuum, there is a third control mechanism which adjusts the control valve ports in accordance with the shifting of the fluid drive unit from a torque converter to a fluid coupling, and vice versa.

These three adjustments of the control valve ports of the unit are controlled through a system of draw rods and levers so linked and arranged as to adjust the control valve ports for causing the automatic control of this unit to progress from the slowest and most powerful driving conditions to the fastest and least powerful driving conditions as rapidly as the engine can accelerate the vehicle and to return the unit through its various phases toward the more powerful but slower driving conditions as conditions requiring such changes are encountered.

In a preferred form of the present invention there is provided a fluid torque converter which has means for changing the torque converter to a fluid coupling and locking the turbine and reaction members for conjoint rotation, which means is automatically controllable by the automatic control unit. The transmission also includes a change-speed gear box having a low and high gear ratio, with shiftable means controlled by engine torque and coasting torque to provide the actual shifting force, and which is automatically controlled by the control unit in accordance with conditions encountered by the vehicle to shift from one ratio to the other and backwardly in accordance with such conditions. This mechanism allows direct shifting from one ratio to another ratio by the engine torque acting through helical teeth formed on the clutching mechanism. In addition to these two fundamental units, the transmission is provided with shift brake means which controls the driven shaft to hold it against engine torque when the torque converter is idling for allowing preselection of forward or reverse drive without possibility of gear clashing or overcoming the idling torque imposed on the gear faces. All of these various shifting mechanisms except the shift brake control are under the control of the automatic control unit which may be mounted on the side wall of the transmission housing, and consists of an oil pump driven by the final drive shaft of the transmission to impress the variable pressure caused by the speed of rotation of this shaft on a sliding piston which controls the flow of oil under pressure through various ports to produce the various automatic shifts to occur as desired, depending upon engine vacuum. Consequently, the automatic control of the unit is determined by its speed and power requirements. This control unit also includes a linkage mechanism having a plurality of positions determined by the position of the speed changing clutch in the transmission, the shift means for the fluid unit and the engine vacuum.

Other objects and advantages of the present invention will appear more fully from the following detailed description, which, taken in conjunction with the accompanying drawings, will disclose to those skilled in the art, the particular construction and operation of preferred forms of the present invention.

In the drawings:

Figure 1 is an elevational view of a transmission unit embodying the automatic control features of the present invention;

Figure 2A is a sectional view through one form of the transmission, showing in detail the fluid unit and the shift brake mechanism;

Figure 2B is a continuation of the sectional view of Figure 2A, showing the details of the change speed gearing and the clutching unit;

Figure 3 is a sectional view corresponding to Figure 2A of a modified form of construction;

Figure 4 is a sectional view corresponding to Figure 2B of another modified form of the invention;

Figure 5 is a detailed sectional view of the oil pump and control valve assembly of the automatic control unit;

Figure 6 is an elevational view of the fluid pump;

Figure 7 is a diagrammatic showing of the linkage arrangement responsive to the shift mechanism for the change-speed gearing, the shift mechanism for the fluid unit, and the engine vacuum shift mechanism, which co-acts with the control valve assembly;

Figures 8 to 17, inclusive, are diagrammatic illustrations of the control valve unit in its various positions;

Figures 8A to 17A, inclusive, are corresponding projections of the control valve unit in each of the positions corresponding to Figures 8 to 17;

Figure 18 is a somewhat diagrammatic view of the linkage arrangement in one of its adjusted positions;

Figure 19 is a corresponding view of the linkage mechanism when shifted to another of its positions; and Figure 20 is a diagrammatic view of a complete automatic control assembly of modified form.

Referring now in detail to the drawings, in Figure 1 there is disclosed the engine 5 to which is coupled the fluid unit 6, a control housing for the control of the fluid unit indicated at 7, and the change speed gearing housing 8 from which emerges the final drive shaft 9 which is coupled to the propeller shaft of the vehicle. The various legends on this drawing indicate various control elements which will be described in more detail hereinafter.

The engine 5 is preferably provided with any conventional type of fluid pump for delivering fluid under pressure into the line 10, which fluid passes into the T 11 and through one connection or conduit 12 provides the inlet fluid for the torque converter unit 6. The other branch of the T 11 directs fluid pressure through connection 13 to a control housing 14 which carries a suitable valve mechanism controlled by crank 15 and control rod 16 for selecting either forward or reverse drive in the transmission. The control rod 16 is connected in any suitable manner to a control lever preferably arranged on the steering post of the vehicle, and manually selected by the driver to condition the gearing in the transmission for either forward or reverse drive. Thus, the operator, after the engine has been started, may actuate this control mechanism to place the gearing in the transmission in a condition for either forward drive or reverse drive, depending upon the desired direction in which he wishes the vehicle to move.

Mounted on the side wall of the transmission housing 8 is a plate member 17 which, on its inner face, may carry the control valve assembly of Figure 5 and which is readily removable for any adjustment or inspection that may be desired. Located above the control valve mechanism and extending through the transmission side wall is a first control unit shaft 18 having the actuating crank 19 and control rod 20 which is connected through suitable motion transmitting means to a vacuum responsive member, such as a diaphragm member. This member is responsive to the vacuum in the engine intake manifold through a vacuum connection tapped into the manifold, and provides for shifting the rod 20 to cause oscillation of the shaft 18 from one position, indicating high vacuum to a second position indicating low vacuum. Disposed above the shaft 18 is a second control unit shaft 22 having a crank 23 connected thereto, forming part of the control mechanism to be described hereinafter, which crank in turn is connected through a draw rod 24 so as to respond to movement of a power shift mechanism that controls the shift between low speed and high speed ratios in the transmission. This power shift mechanism is indicated generally at 25. It may include a piston operable from one position to another position for effecting selective release of the clutching unit in the transmission to move from one clutching engagement in one gear ratio to a second clutching arrangement for a second gear ratio. The third control unit shaft 26 extending through the side wall of the transmission has a crank 27 connected thereto which, through the rod 28, is connected to a control member connected to the fluid unit for shifting the shaft 26 from one position when the fluid unit is operating as a torque multiplier into a second position when the fluid unit is shifted into operation as a fluid coupling. The fluid unit control portion of the power shift mechanism also includes a piston rod 29 connected by lever 30 to a crank 32 connected to the shaft 33 extending into the control housing 7 of the fluid unit. This piston rod 29 operates in accordance with the setting of the valves in the automatic control unit for effecting shifting of the fluid unit from a torque multiplier to a fluid coupling, and vice versa.

The power shift mechanism also has a third housing 34 from which extends a piston rod 35 which, through the control rod 36, is connected into the throttle of the vehicle for controlling the throttle position to provide idling of the engine for cutting out the engine torque while the power shift is being made from low to high speed. The control unit has suitable connections, as will be described hereinafter, for shifting the piston in opposite directions.

The control housing 7 for the fluid unit is provided with an outlet 37 which, through conduit 38, is connected into a conduit 39 leading into the power shift mechanism housing for delivering fluid under pressure thereto to effect the desired power shifts when conditions are such that the automatic control valve opens the selected ports.

This figure represents diagrammatically the manner in which the transmission of the present construction may be provided with the various control elements which, under the control of the automatic control unit, will allow automatic and progressive shifting of the transmission through the various speed changes, depending upon the power and speed requirements of the engine. The details of these control elements and their cooperating action under the influence of the control unit will be described in more detail in connection with the actual internal construction of the transmission, as shown in Figures 2, 3 and 4.

Considering now Figures 2A and 2B, the crankshaft 40 of the engine is connected through the studs 41 to a flywheel spider 42 carrying the starting ring gear 43, and also having bolted thereto as by means of studs 44 the driving or impeller member 45 of the fluid torque converter. The impeller 45 is provided with a series of fluid inlets 46 through which oil is forced under pressure into the interior of the impeller. The hub portion 47 of the impeller is provided with the seal means 48 sealing against the flange 49 of a bushing 50 bolted or otherwise suitably secured, as at 52, to a partition wall 53 of the fluid housing 6. The control unit for the fluid housing is carried in the housing member 7, and there is provided a passageway or fluid duct 54 connected by any suitable means to the conduit 12, whereby oil flows through the duct 54 and thence through passageways 55 intermediate the studs 52 into the space 56 disposed within the hub portion of the impeller 45.

The rotor or driven member 57 of the torque converted has sealing engagement with the annular shoulder 58 of the spider 42, and also is provided with the hub portion 59 rivited as at 60 to a sleeve member 62 splined on the driven shaft 63 of the fluid unit. The shaft 63 is preferably hollow for at least a portion of its length, and has the reduced end 64 journalled by the bearings 65 in a suitable pilot recess in the hub portion of the spider 42. The turbine 57 is prevented from movement to the left on the splines 63 by means of the lock nut 66 threaded on the shaft. The opposite end of the sleeve 62 forms a stop for the bearing assembly 67 upon which is mounted the stator or reaction member 68 of the fluid torque converter, this stator member having bolted thereto as by means of studs 69 a sleeve member 70 having an extended inwardly flanged hub portion 72 provided with ratchet teeth 73.

The teeth 73 are adapted to engage corresponding ratchet teeth 74 splined on bushing 50 as by means of helical splines. Oil holes 75 provide for flow of lubricating oil to this position of the unit. The member carrying the teeth 74 is provided with a tapered external surface 76 adapted to be engaged by a plurality of spring pressed balls 79 carried by circumferentially spaced arms 80 carried by a ring member 82 bolted to the stator 68. Whenever the stator tends to rotate rearwardly, the pressure of the balls on the tapered surface feeds the splined member 74 inwardly to engage the ratchet teeth with teeth 73, locking the stator against reverse rotation. However, rotation of the stator 68 conjointly with the turbine 57 causes a reverse action, tending to move the teeth 74 out of engagement with the teeth 73 to allow free forward rotation with the stator.

The housing 7 is piloted in and securely bolted to the fluid unit housing 6 as by means of the studs 83, there being a suitable inspection opening 84 provided in the bottom of this housing. The inwardly directed flange 53 of the housing 7 has bolted thereto the member 51 which carries the brake drum 85 having a suitable oil retaining flange 86 pressed thereover. A suitable seal 87 is provided between the hub 88 of the member 51 and the shouldered portion 89 of the shaft 63 to prevent the escape of fluid from the torque converter unit into the housing 7. The annular seal ring 90 forming a part of this seal also functions as a stop for the helically coiled spring 92, which is biased between the ring 90 and the recessed part of a sleeve 93 splined for axial sliding movement on the shaft 63. The shaft 63 adjacent this point is provided with an elongated slot 94 through which extends a pin 95, this pin being secured in the sleeve 93 and engaging in a suitable slot 96 formed in a sliding pull rod 97 disposed within the bore of the shaft 63. The pull rod 97 is arranged to normally be pressed to the left by the spring 98 bearing at one end against the base of the bore in the shaft 63, and at the opposite end against the head end portion 99 of the pull rod. The sleeve 93 is provided with a helically splined external portion 100 upon which is mounted the correspondingly splined hub portion of a brake member 101 adapted to engage the brake surface 85. This member is normally pressed against a stop ring 103 by means of the spring 104, which spring is biased at its opposite end against the ring 105 carried on the sleeve 93 and forming one stop for a bearing assembly 106, the opposite side of the bearing being held against axial movement by the ring 107. The bearing 106 is provided with an annular yoke or collar 108 adapted to be engaged by a suitable shift mechanism operated by the foot brake 109 shown in Figure 1. Depression of the brake pedal 109 moves the bearing assembly, and consequently the sleeve 93 to the left, as viewed in Figure 2A, causing the brake 101 to engage the brake drum 85. Initial engagement therebetween provides a threading action, tending to rotate the sleeve 93 in a direction opposite to the normal rotation of shaft 63 so that the application of this brake will stop the rotation of the shaft when the torque converter is idling, and, upon further actuation of the pedal, will cause the sleeve 93 to effect through the threading action of the helical splines 100 a slight reverse rotation of the shaft to facilitate shifting of the gears in the transmission to select either forward speed or reverse drive by manual selection from the steering wheel. It will be noted that there is a resilient lost-motion connection between the brake 101 and sleeve 93, which provides a semi-self-energizing action for the brake so that once it engages, the tendency is to thread the sleeve 93 outwardly therefrom, but since the pedal is being depressed, the sleeve will actually effect slight reverse rotation of the shaft 63. This particular brake construction is shown more clearly and described in more detail in my copending application, Serial No. 480,714, filed March 26, 1943, which is now Patent No. 2,368,148, dated Jan. 30, 1945, and need not be described in detail herein.

The pin 95 carried by the sleeve 93 has free movement within the slot 94 of shaft 63 to facilitate operation of the brake. This movement is also provided in order to facilitate operation of the clutching means by which the torque converter is changed to a fluid coupling, without interfering with the brake operation.

In converting the torque multiplier to a fluid coupling, shifting of the sleeve 93 to the right causes the pin 95 to move to the right, thereby exerting a pull on rod 97 within shaft 63. The opposite end of rod 97 is provided with detent members 110 engaging in suitable recesses in the hub portion of a clutch gear 111 splined on shaft 63. The clutch gear 111 is provided with external clutch teeth 112 adapted to have clutching engagement with the teeth 113 carried by the hub of the member 72.

Consequently, upon being pulled to the right, the rod 93 causes the clutch member 111 to move into clutching engagement with the member 70 locking the stator 68 to the shaft 63 for conjoint rotation therewith. Since the turbine 57 is also splined to the shaft 63, it will be obvious that the two elements of the converter will be coupled for conjoint rotation, thereby changing the torque converter to a fluid coupling. The shaft 63 is provided with an elongated slot 114 to accommodate this movement of the clutch member. The slot 96 in pull rod 97 allows operation of the brake mechanism 101 without in any way affecting the clutch member, since this movement is in the opposite direction or to the left, and clearance is provided for this purpose. Preferably, a suitable oil seal ring 115 is interposed in the bore of the shaft 63 to prevent leakage of oil rearwardly through this bore. The spring 98, as will be noted, urges the pull rod 97 to the left, and normally tends to maintain the clutch disengaged unless shifting force is applied to the yoke 108.

The shaft 63 at its rearward end terminates in the drive pinion 116 having teeth 117 adapted to mesh with the teeth 118 of gear 119 keyed to the countershaft 120 of the transmission. The shaft 63 is supported in suitable ball bearings 122 carried in the end wall 123 of the housing 8, which is bolted or otherwise suitably secured to the housing unit 7. This end wall carries suitable means locking the bearing assembly 122 in place and also has a bore therein for receiving the reduced end 125 of the countershaft 120, this being mounted in a suitable bearing assembly 126.

The main drive shaft or output shaft of the transmission, as indicated at 127 in Figure 2B, includes a reduced end 128 mounted in the needle roller bearings 129 disposed within the end of the shaft 63, thereby piloting the end of shaft 127 in the end of shaft 63. The countershaft 120 is provided with integrally formed gears 130 and 132, the gear 130 having constant meshing engagement with a gear 133 rotatably mounted, as by means of bearings 134, upon shaft 127.

The gear 132 of the countershaft is adapted to mesh with a sliding reverse gear 135 mounted on a layshaft (not shown), which in turn has meshing engagement with the gear 136 keyed or otherwise mounted for conjoint rotation with shaft 127. Intermediate the gears 133 and 136 on the output shaft 127 is a worm gear member 137 which drives a second downwardly extending worm gear 138 operating a pump to be described in detail hereinafter.

The countershaft 120 at its opposite end is mounted in the ball bearing assembly 139 carried in the end wall 140 of the transmission housing 8 and suitably covered by the cap member 142. The opposite end of shaft 127 is mounted in a ball bearing assembly 143 also carried in the end wall 140 of the transmission 8. A suitable speedometer gear 144 is mounted on the rearward extension of the shaft 127 with suitable oil seal 145 provided about the hub 146 of a universal joint or other means for connecting the shaft to the propeller shaft of a vehicle.

Mounted intermediate the pinion gear 116 and the gear 133 on shaft 127 is a blocking type coupling mechanism which is so designed as to be locked in either of its engaged positions, and when released, the torque of the engine in one case, or the coasting torque of the vehicle in the other case, will automatically expel this mechanism from one gear engaging position, and when the opposite gear approaches synchronous speed will cause automatic engagement of the mechanism with such gear, thereby producing a shift without declutching the engine, which is accomplished automatically, as will be described hereinafter.

This coupling mechanism comprises a sleeve member 150 splined on axially extending splines 152 formed on shaft 127 and provided with oppositely arranged external annular helical teeth 153 and 154, respectively, at opposite ends thereof. Encircling the sleeve 150 there is provided a blocker member 155 having circumferentially spaced axially elongated slots 156 through which extend a plurality of detent members 157 carried in radially directed sleeves 158. An annular yoke or ring member 159 encircles the detents and is provided with alternate relieved portions 160 extending in opposite directions and engaging alternate detent members 157. For example, if there are six detent members 157 provided around the periphery of sleeve 150, the ring 159 will have three recesses formed as indicated at 160, and intermediate thereto will have three additional recesses opening in the opposite direction, each of the recesses engaging over one of the detents.

The blocker member or sleeve 155 is provided at its ends with internal teeth 162 and 163, respectively, arranged on the same helix angle as the teeth 153 and 154. On the external surface of blocker member 155 opposite teeth 162 and 163, respectively, there are provided tapered friction rings 164 and 165 which are adapted to engage corresponding tapered friction surfaces 166 and 167 carried by extension of the gears 116 and 133, respectively. This forms the friction drag surfaces for controlling the blocking action. Also, the gears 116 and 133 carry helically splined internal teeth 168 and 169, respectively, which form the clutch teeth providing for final coupling of the clutch sleeve 152 thereto to couple these gears for conjoint rotation with the shaft.

In the operation of this mechanism when the collar or yoke 159 is shifted to the left, for example, the sleeve 150 moves therewith, the snap ring detent providing conjoint movement until the friction elements 164 and 166 engage. Further shifting pressure produces frictional drag between the mating friction surfaces will result in the teeth being offset a matter of approximately half a tooth space, preventing sliding movement of the sleeve 150 through the blocker member 155, although such pressure tends to collapse the spring detent. This condition exists until such time as the blocker member 155 and the gear 116 approach synchronous speed bringing member 150 and shaft 127 to the same speed due to the action of pin 157 reacting against the blocking surface of sleeve 155, at which time the reverse drive on sleeve 155 allows the teeth 162 of the blocker member to be moved forward into a position to allow passage of the teeth 153 of sleeve 150 therethrough and into engagement with teeth 168 of gear 116 the detent being then depressed to allow relative movement of member 150 with respect to the sleeve. This completes the shifting movement for locking the shaft 63 to the shaft 127 for conjoint rotation. At the same time, detents 157 will drop into the corresponding recesses 172 in the shaft 127, and further movement of the yoke 159 will force the inner surface of the yoke over the ends of the detents 157, locking the mechanism in position and clutching the two shafts for conjoint rotation.

The purpose of providing the locking mechanism for preventing release of the detents 157 from recess 172 is to prevent expulsion of the sleeve 150 from the teeth 168, which would normally occur due to the helix angle thereof. Consequently, this must be locked in position or the engine torque will thread the sleeve 150 out of engagement and toward neutral position. In shifting in the opposite direction, the yoke first releases the detents to cause expulsion of the sleeves 150 to the right. As the yoke 159 moves further to the right, it will carry sleeve 150 therealong until snap ring 170 engages in blocker member 155. From this point on, blocker member 155 will move conjointly with sleeve 150 until friction surface 165 of the blocker member engages the corresponding friction surface 167 of gear 133. This will produce a drag on the blocker member, causing it to rotate out of alinement so that teeth 154 cannot move past teeth 163.

At the same time, detent 170 will be collapsed by the shifter action to allow relative axial movement of sleeve 150 relative to blocker member 155 up to the point where teeth 154 abut teeth 163. As the blocker member and gear 133 approach and reach synchronous speed, the teeth 163 will move into position, as previously described to allow passage of teeth 154 therethrough into engagement with teeth 169 of gear 133. This clutches gear 133 to shaft 127 for conjoint rotation. At the same time, the detents 157 move into position to drop into recesses 173 in shaft 127, and are locked therein by continuing movement of yoke 159, which moves over the top of the detents to hold them from disengagement.

Thus, the transmission is then locked in low gear drive from gear 116 through gear 119 and countershaft 120, and thence through gear 130 and gear 133 to shaft 127. This entire shifting movement is produced automatically by the automatic control unit previously referred to, and which will be described in more detail hereinafter.

Suffice it to say, that when it is desired to move from low gear ratio in the transmission back toward high gear ratio, the helix angle of teeth 169 reacting against teeth 164 will tend to expel the sleeve 150 from engagement with the gear 133, but such expulsion cannot occur until such time as detents 157 are released by movement of yoke 159 out of position to release the detents for movement out of releases 173. When this occurs, the sleeve 150 will be expelled from gear 133, and will move to the left, picking up the blocker member 155 as snap ring 170 drops into the groove 171 in the blocker member. Also, due to the helix angle when the sleeve member 150 is rotating faster than gear member 116, there is a tendency for the sleeve 150 to be drawn into engagement with the teeth 168 until such time as the engine speed picks up to apply torque through this drive.

Consequently, with this type of coupling mechanism, there is no necessity for declutching the engine in shifting from low gear to high gear, or vice versa, and the blocker member assures that there will be no clashing of gears during this shift.

Considering now the disclosure of Figures 3 and 4, it will be noted that in many respects the construction shown in these two figures is similar to that shown in Figs. 2A and 2B, and consequently similar reference numerals are applied to corresponding parts. Considering Fig. 3 in detail, which is the showing of the torque converter and the brake mechanism for facilitating shifting while the engine is idling against the idling torque of the converter, it will be noted that several modifications are made over the construction shown in Fig. 2A in providing a slightly modified form of brake construction and a different shift mechanism for changing the torque converter to a fluid coupling.

In this connection it should be noted that the teeth 113' on the clutch member 72 are disposed adjacent the bearings 87, while the teeth on the shifting pinion 111' are disposed in the space between the teeth 113' and the ratchet teeth 73-74, which latter teeth act as a one-way clutch for the stator or reaction member. These teeth are indicated at 112' and, upon movement of the shifting mechanism to the left as shown in Fig. 3, are adapted to mesh with the teeth 113' to lock the stator 68 for conjoint rotation with shaft 63 and consequently with the turbine or driven member 57. It will be noted that the pinion 111' is splined on the shaft 63 for conjoint rotation therewith, and is controlled by the pin 110' carried in the sleeve 180, which in turn is pressed into the sliding plunger 182 mounted in the counterbored portion of the shaft 63. A suitable spring 183 normally urges the plunger 182 to the right, holding the teeth 112' and 113' out of engagement. A suitable pin 184 holds the lock pin 110' in position, and is threaded into the outer end of the plunger 182. The plunger 182 has bearing against a spacer member 185 which in turn seats at the lower end of the bore of the shaft 63 against a stop member 186.

When the plunger 182 is moved to the left, the pin 110' carries the clutch teeth into engagement. This movement is effected by the rod 187 located within the shaft 63 and carrying a radially extending pin 188, which in turn engages a sleeve 189 carried on the splines 190 formed on a shouldered portion of the shaft 63. The sleeve 189 is shiftable to the left by means of a suitable shift member engaging the collar 192 carried by the bearing assembly 193. Movement of this shift mechanism results in clutching of the teeth 112' and 113' together. Upon movement of the shift mechanism in the opposite direction, the spring 183 produces disengagement of the clutch teeth, releasing the stator 68 so that it can become locked against the sleeve carried on the splined portion of the flange member 49 secured to the housing, thereby locking the stator against reverse rotation.

The fluid for the torque converter is introduced through the passageway 54 and thence through passageways 194, which alternate with the bolts or studs 52 to introduce the fluid into the chamber 56 from whence it flows into the interior of the converter.

The sleeve 189 is provided externally with the helically splined portion 195 upon which is mounted the brake spider 196. This spider has a brake surface 197 adapted to engage the internal braking surface of the drum 198, which is secured to the end wall of the converter housing as by means of studs 199. A suitable oil retaining member 200 is pressed over the drum 198 to retain oil on the braking surfaces, as described previously. The brake member 196 is normally urged against the stop 201 carried by the splines 195 by means of a spring 202, and when the brake drum is engaged and the spider 196 tends to stop rotating, further movement of the shifting mechanism causes the sleeve to be threaded through the hub of the spider on the helical splines, thereby causing slight reverse rotation of shaft 63 to facilitate shifting of the gears in the transmission.

Considering Fig. 4, this figure is substantially identical with that shown in Fig. 2, and the mechanism shown therein functions in substantially the same manner, it being noted that intermediate the gears 133 and 136 there is provided the worm 137 driving the corresponding worm 138 which carries a depending shaft 205 leading to the oil pump for the automatic control system.

Considering now this oil pump construction and the associated valve arrangement which is shown in more detail in Figs. 5 to 17, inclusive, the shaft 205 driven from the main shaft of the transmission is coupled to a driving spud 206 carrying an eccentrically disposed impeller 207 adapted to rotate within the pump chamber 208 for drawing oil from the reservoir through conduit 209 into the chamber and forcing it under pressure outwardly through outlet 210 to the valve mechanism. The pump assembly is enclosed by the body member 212 which is secured to a mating extension 213 of the valve body 214. It will be noted that the member 212 has an arcuately shaped spacer 211 forming the dividing means for the pump and is a construction which is common and is known as an eccentric type of oil pump.

From the outlet 210, the fluid under pressure passes through passageway 215 in the valve body and into the chamber 216 disposed above a rotatable outlet port member or piston 217, rotating about the cylindrical extension 218 of the mating portion 219 of the valve body. This valve construction is shown in more detail in Figures 7 to 17, inclusive, and will be described in various positions of operation in connection with such figures.

Suffice it to say, that as the rotatable member 217 shifts from one position to another, the fluid under pressure is allowed to pass through passageway 220 and thence up against the head end 222 of a piston or rod member 223 which in turn through an extension 224, controls the automatic shift mechanism in the transmission. A second member (not shown), corresponding to the plunger 222, is also provided for controlling the operation of the torque converter, as will be described in detail hereinafter.

In order to accommodate leakage in the valve, pressure controlled bypass valves 225 and 226 are provided which are adjustable to meter the flow of fluid outwardly through ports 227 and 228, respectively, and thence thru discharge openings 229 and 230, respectively. It will be noted that the oil from passageway 215 connects through the valve opening 232 and the port 233 to the shank side of the control rod piston 223, and also to the corresponding control rod piston for the torque converter and fluid clutch shift mechanism. The relief valve adjusting screw 226 gages the pressure developed by the oil pump 50 during the first stage of the control valve operation.

The annular piston or valve member 217 has the oil under pressure from passageway 215 imposed thereagainst, and this oil pressure moves it to the successive positions shown in Figs. 8 to 17 as the higher pressures are developed due to the direct gear drive of the pump shaft 205 to the transmission main shaft, which makes this pressure directly proportional to the speed of the vehicle. The spring 233 yieldingly holds the valve 217 from being moved by the oil pressure in the chamber 216 until such time as this pressure rises to the pressure set by the adjusting screw 226, at which time the piston or valve member 217 moves circumferentially so as to open the port 220 in the rotatable member 235, causing this port to communicate with the opening 236 leading into the chamber at the large end 222 of the piston. The oil pressure thus thrusts against the head 222 of the control rod, shifting it upwardly and causing it to open a control pressure valve in the control mechanism 25 of Figure 1 for operating a gear shift to shift the transmission from low gear ratio to high gear ratio.

The sliding valve port member 235 is rotated so as to vary the pressure at which the shift from low to high gear range will occur by the adjusting rod or arm 237 shown in Figures 7 to 17, inclusive. This adjusting arm advances the port 220 closer to the end of the valve member 217 when the low range of the transmission is not fully used and allows the shift to the high range to be made, but acts to move the port 220 further away from the end of valve 217 when the shift is made back to the low range, thus insuring that the oil will not be able by its pressure to move the piston 217 far enough to open port 220 and cause an immediate shift back to the high range. This differential action will be more fully explained as the description proceeds.

The arm 237 is controlled by a combination of levers which shift in part as a function of the vacuum in the engine manifold, which decreases as the engine begins to labor, or as the engine becomes more fully loaded, and increases as the engine load becomes less. This vacuum which is measured by the pressure in the intake manifold, which operates a vacuum control piston to control the arm 238 carried by shaft 18 so as to advance the control arm 237 in a downward direction when a high vacuum is present in the engine manifold, causing the vacuum responsive member, such as a diaphragm, to actuate rod 20 in a direction to rotate shaft 18 clockwise. The arm 237 is moved upwardly under a low vacuum condition by counter rotation of shaft 18 under influence of the manifold vacuum responsive means, thereby adjusting the sliding valve port member 235 to allow a shift from low range to high range, depending upon the power being used and the vehicle speed which is sensed by the variation in pressure in the oil pump.

Considering now the showing in Figure 7, the various control mechanisms in the position shown in full lines in this figure indicate that the transmission is conditioned for operation with the converter functioning as a torque multiplier, the transmission being in low gear range and with low engine vacuum. This is the condition which would occur as the operator starts the vehicle from a standstill in low gear, and requires torque multiplication as well as the low gear range because of the load on the vehicle. The transmission at this time will be operating with its main shaft at relatively low speed, and consequently, the oil pump will not be delivering oil under a pressure sufficient to move the piston member 217 into a position to uncover the port 220. At the same time, the control arm 237 will be in a position holding the port 220 retracted relative to the end of piston 217 so that the oil pressure from passageway 215 cannot pass into the head end of the control rod 222, but instead passes through port 233 and is relieved through relief valve 226.

As the vehicle begins to pick up speed the oil pressure against the end 240 of piston 217 begins to increase and the piston starts to rotate against the pressure of spring 233 in a counterclockwise direction, as viewed in Figs. 8 to 17, the initial movement of the mechanism being shown in Fig. 8. This movement of the piston 217, under increasing pressure, moves the head end 240 of the piston into the position shown in Fig. 9, where it is at a position just about at the point of uncovering the port 220. In the position shown in Fig. 9, the transmission is still in a torque multiplying, low gear, low vacuum condition, as indicated by reference characters TM—LG—LV adjacent arm 237. As the vacuum increases, however, the vacuum responsive means operates to shift the lever 238 through rod 20 and shaft 18 in a clockwise direction, or toward high vacuum position, as indicated by reference characters HV, lowering lever rod 242 about its pivot 243 at the opposite end, and thereby move control rod 237 slightly downwardly, as indicated in Fig. 10. This movement pushes the port 220 forwardly relative to end 240 of the piston 217, uncovering the port as indicated at A in Figure 10 and allowing fluid under pressure from port 215 to flow into port 220, and consequently up against the head end of control rod 223. At the position shown in Fig. 10, therefore, the transmission is shifting from a condition of torque multiplication, low gear range, low vacuum into a condition of torque multiplication, low gear range and high vacuum, and as this high vacuum stage is reached and the control arm 237 moves downwardly, the port 220 is open to fluid pressure due to the shift from low vacuum to high vacuum. Immediately upon fluid flowing into port 220, control rod 224 is raised, which through the power shift mechanism 25, which may be any type of shift actuator in the transmission, shifts the yoke 159, for example, in Figure 20, to the left to shift the transmission from low speed to high speed range. Upon acceleration of the engine, this causes the head end 240 of piston 217 to move further around in a counterclockwise direction against the pressure of the spring due to the increased rotation of the main shaft of the transmission, which develops more oil pressure. Simultaneously the control rod 24 controlled by the shifting mechanism 25 in the transmission is moved downwardly to rotate arm 244 corresponding to lever 23 of Figure 1, about the pivot 22, shifting this arm from low gear to high gear position, and consequently moving pivot 245 downwardly, which causes arm 246 to rotate downwardly about its pivot 247 and through link 248, results in holding control arm 237 in its lowered position even though the vacuum decreases as the transmission shifts into high gear. This position is shown in Figure 10, and the initial position of the mechanism as the next operation occurs is shown in Fig. 11 with the final position shown in Fig. 12.

In Fig. 11, it will be noted that the head end 240 of the piston has still not moved sufficiently far to uncover the port 221 associated with a control rod corresponding to control rod 223, which controls the torque multiplier and fluid coupling.

In the condition shown in Figure 11, the transmission is in a position of torque multiplication, high gear and low vacuum, the vacuum control arm 238, under influence of rod 20 having shifted upwardly at the same time that the arm 244 shifts downwardly to hold the control arm 237 in position. However, as the speed of the vehicle increases, the vacuum in the engine manifold increases and the rod 20 is again actuated so that arm 238 again shifts downwardly, thereby shifting control arm 237 downwardly into the position shown in Fig. 12, which again moves the rotatable valve member 235 in a clockwise direction, uncovering port 221 by moving it forwardly of the head end 240 of piston 217. Fluid under pressure from port 215 consequently flows into port 221 to actuate the second control rod (not shown in member 219) which operates to shift the control piston 29 of Fig. 1, and consequently the rocker arm 32 for shifting the clutching mechanism, shown in Figs. 2A and 3, to couple the stator to the output shaft of the converter for conjoint movement with the turbine, thereby changing the converter from a torque multiplier to a fluid coupling.

Thus, in Fig. 12, a fluid coupling, high gear and low vacuum condition is provided, it being understood that during any of the shifts from lowest range on up, the high vacuum condition immediately changes to a low vacuum condition and then as the speed of the vehicle increases, gradually returns to a high vacuum condition. Thus, while arm 238 moves upwardly to low vacuum condition, at the same time, the second control rod in the valve assembly 219 shifts to fluid coupling position and as this shift is completed, the arm 248 through rod 28 and shaft 26 moves from torque multiplying condition downwardly in a clockwise direction to a fluid coupling position, thereby moving link 249 downwardly, which maintains arm 237 in the same position. The vehicle is now operating with the torque converter as a fluid clutch and in high speed, but is under load and consequently the manifold presents a condition of low vacuum. As the vehicle reaches its cruising speed, the low vacuum control operates arm 238 downwardly to move control arm 237 still further downwardly into the position shown in Fig. 13. This full uncovers port 221 and the vehicle will stay in this operating condition so long as the speed of the vehicle is such as to provide sufficient pressure against the head end of piston 240 to hold the opposite end 241 of this piston against the stop 241'.

This is the cruising range of the vehicle and the arm 237 under these conditions is in its lowermost position, it being noted that control arms 238, 244 and 248 are all in their lowermost positions, as shown in full lines in Fig. 19. It is to be observed that the vacuum control means in the intake manifold controls the movement of arm 238 from its upper position, which is a low vacuum condition, to its lower position which is its high vacuum condition. Similarly, control rod 223 in the valve 214 which operates the shift mechanism in the transmission from low range to high range also produces corresponding movement of control rod 24 when the shift is produced in the transmission, which in turn raises or lowers arm 244 about pivot 32. In Fig. 7 this arm 244 is shown in low gear position. When the transmission shifts to high gear, the control rod 24 is moved downwardly, moving the arm 244 to high gear position, as shown in Figs. 18 and 19.

Control arm 248 mounted on pivot 26 is controlled by the shifting movement of the clutch 111 if Fig. 2A or 111' of Fig. 3, being normally in upper position as shown in Figs. 7 and 18, when the torque converter is operating as a torque multiplying unit. When the piston 217 moves around to a position to uncover port 221, the second control rod in valve 214 operates, which through the fluid unit shift piston 29, shifts arm 32, thereby shifting the yoke assembly 108 of Fig. 2A to the right, producing clutching engagement between the shaft 63 and the stator 68 locking the stator and shaft together for conjoint rotation with the driven member 57. This produces a fluid coupling condition for the torque converter where no more torque multiplication is provided but the unit operates solely as a fluid clutch. When this shift is made, arm 248 is moved from the position shown in Fig. 18 to the position shown in Fig. 19.

When the vacuum in the engine manifold begins to decrease, indicating that the engine is operating under a heavy load, and consequently the speed of the vehicle decreases, producing less pressure against the head end 240 of piston 217, a point is reached at which the vacuum control means shifts arm 238 from the position shown in Fig. 19 back to the position shown in Fig. 18. This produces a fluid coupling, high gear, low vacuum condition, causing arm 237 to raise upwardly from the position shown in Fig. 13 to that shown in Fig. 14. At the same time, the pressure against piston 217 decreases due to decreasing speed, and consequently port 221 is closed by a return movement of piston 217 under the influence of spring 233. As a result, the closing of port 221 results in the second control rod of valve 214 moving downwardly, causing a shift from fluid coupling position to torque multiplying condition which simultaneously declutches the stator 68 from the shaft 63 and raises arm 248 from the position shown in Fig. 19 to that shown in Fig. 18.

The vehicle is then operating under a condition of torque multiplication, high gear, and since the fluid coupling has been shifted to a torque multiplier, the load on the engine decreases and a high vacuum condition occurs in the intake manifold, holding the arm 237 in the position shown. However, if the load on the vehicle is still too much for proper operation under a condition of torque multiplication and high gear, the vacuum decreases in the intake manifold to a point at which the arm 238 moves upwardly to low vacuum condition. This raises arm 237 still further from the position shown in Fig. 14 to that shown in Fig. 15, and conditions the system for shifting into low gear, it being understood that port 221 remains closed throughout this period. Since the speed of the vehicle is continuously decreasing, the pressure on head end 240 of piston 217 continues to decrease, allowing the piston under influence of spring 233, to return still further to the position shown in Figure 16 where it closes off port 220 as well as port 221. Closing of port 220 cuts off fluid pressure to control rod 223, causing the control rod to move downwardly due to the back pressure on the upper side thereof, thus shifting the transmission from high gear to low gear. This causes arm 244 to move upwardly, which, through the linkage system holds arm 237 in the position shown in Figure 16 as the vacuum condition changes from low vacuum to high vacuum due to the shift from high gear to low gear.

The vehicle is now operating under a condition of torque multiplication low gear range and high vacuum. If the load is still such as to cause decreasing speed of the vehicle, the vacuum controlling valve will shift the arm 238 to low vacuum condition, whereupon all the linkage arms will be in the position shown in Figure 7 and the control piston and valve structure will be as shown in Figure 17, which is identical with that shown in Figure 8, wherein the vehicle was preparing to start from a standing position. At this time, the engine speed is not sufficient to move the piston 217 against the pressure of spring 233. If the vehicle has now surmounted the difficulty which has caused it to labor, the piston 217 starts to open and the entire cycle of operations may be repeated.

It is to be understood of course that intermediate shifts can be made without going through the entire cycle of shifting operations. For example, the vehicle may be cruising and encounter a slight hill which causes it to change from a fluid coupling, high gear condition to a torque multiplying, high gear position, which may be sufficient to pull the vehicle over the hill without any further shifting. Upon again attaining a high vacuum condition, the shift may revert back to a fluid coupling high gear position without any further change.

The purpose of the reliefs 250 and 252 adjacent ports 220 and 221 is to insure that there will be no fluttering of the shift mechanism due to too narrow a range of operation. In other words, when a shift has once been made at a predetermined point, the condition causing such shift will prevail over a wider range so that a lower predetermined point must be reached before a reversal of this shift can occur. This is to prevent fluctuation of the shift mechanism at any certain point, and provides a differential between shifting on the upward cycle and shifting back on the decreasing cycle, which provides for smooth operation of the shift mechanism.

Figures 8A to 17A provide a developed illustration of the operation occurring in a valve, such as valve 214, under the varying conditions described, and corresponding parts will be indicated by corresponding reference characters. In this developed illustration, it is believed that the operation of the valve or piston 217 will be more clearly illustrated as it moves through its progressive stages to control the shifting operations. For example, in Figure 8A, the member 219 corresponds to the valve body portion 219 of Fig. 5, and is provided with the port 236 leading into the head end of control rod 223 and with the port 253 leading into the head end of the second control rod (not shown), which controls the shift in the torque converter from torque multiplication to fluid coupling condition. The member 235 is the rotatable disc into which the arm 237 extends, and which is shifted through various positions by means of the linkage shown in Figs. 7, 18 and 19. The member 217 is illustrated in Fig. 8A as a sliding piston having its head end 240 arranged to receive fluid under pressure from the port 215 in the valve body 214. The plunger 217 is normally urged to the left by means of a spring 233 corresponding to the circular spring 233 of Figs. 5 and 7. Preferably, the piston 217 is arranged to provide relief through the recess 254, the port 255 and the recess 256 for relieving any fluid under pressure which might be in the control rod system when ports 220 and 221 are closed.

In the position shown in Fig. 8A, the mechanism is in a condition of torque multiplication, low gear and low vacuum with both ports 220 and 221 closed and with insufficient fluid pressure from port 215 on the head end 240 of the piston to move the piston to the right. As the vehicle speed begins to increase, a higher pressure of the oil from the pump is produced which, through port 215, acts against piston 217, moving it from the position shown in Fig. 8A to the position shown in Fig. 9A, at which time the piston 217 moves into a position just covering port 220. However, at the same time, the vehicle moving under a torque multiplying, low gear condition has insufficient load to maintain the low vacuum in the engine manifold and as high vacuum condition occurs, the arm 238 shifts to move control arm 237 downwardly, thereby shifting member 235 to the left, this shift being indicated in Fig. 10A, which in turn uncovers port 220 to allow fluid under pressure to pass to the head end of control rod 222. As this condition occurs, the control rod 223 moves upwardly, shifting the transmission from low gear to high gear. As this shift is effected by the synchronizing mechanism of Figs. 2B and 4, the physical movement of the synchronizing mechanism into high gear position operates control rod 24 downwardly, while simultaneously the vacuum condition in the intake manifold changes from high vacuum to low vacuum. As a result, control arm 237 remains stationary, holding member 235 against movement so that while the port 220 remains open to maintain the high gear condition, the oil pressure of the pump 207 increases, forcing the piston 217 further to the right until it is in a position just adjacent opening of port 221. If the power available at this time is still more than required by the vehicle, a simultaneous shift of the vacuum control from low vacuum to high vacuum is effected as the pressure on the piston 217 increases due to increase in speed of the vehicle. As a result, member 235 is moved further to the left at the same time that the piston 217 moves further to the right.

This results in uncovering port 221 so that fluid under pressure from this port can pass through port 253 in member 219 to operate the second control rod, corresponding to control rod 223, thereby shifting the mechanism shown in Figs. 2A and 3 to lock the stator of the torque converter to the shaft 63, thereby changing the torque converter to a fluid clutch. This occurs when the valve ports are in the position shown in Fig. 12A and results in arm 248 moving downwardly at the same time that the vacuum control shifts from high vacuum to low vacuum. For a short time, therefore, arm 237 remains stationary, but as the vehicle picks up speed, the low vacuum condition changes to a high vacuum condition and arm 237 moves downwardly to its lowermost position, as shown in Fig. 19, shifting member 235 still further to the left, as shown in Fig. 13A.

Under these conditions, both control ports 220 and 221 are open to fluid under pressure and the vehicle is operating under a condition of fluid coupling, high gear, high vacuum, which is its cruising operation. Under these conditions, the increase in speed of the vehicle may move piston 217 further to the right, but such movement has no effect since both parts are already open and piston 217 may vary through a considerable range under these conditions without effecting any change in the condition of the transmission.

However, assuming that the vehicle encounters a hill, the high vacuum condition changes to a low vacuum condition, causing arm 237 to raise upwardly into the position shown in dotted lines in Fig. 18, moving member 235 to the right and at the same time, since the speed of the vehicle is decreasing, the piston 217 moves to the left, which closes port 221, thereby shutting off fluid to the second control rod through port 253. As a result, the shift mechanism of Figs. 2A and 3 declutches the stator 68 from the shaft 63 and the fluid coupling changes to a torque multiplier. This condition is shown in Fig. 14A.

If the vehicle is still losing speed under load, the high vacuum condition produced by the change from a fluid coupling condition to a torque multiplying condition changes to a low vacuum condition, causing arm 238 to move upwardly, raising control arm 237 to the full line position shown in Fig. 18. This moves member 235 further to the right, thus moving ports 220 and 221. At the same time, the speed of the vehicle will be decreasing, reducing the pressure of the piston 217, causing it to move further to the left so that it starts to close off port 220, as shown in Fig. 15A. Upon further decrease in speed, the piston 217 moves to the left sufficient to close port 220, as shown in Fig. 16A, thereby cutting off fluid pressure through port 236 to control rod 22, and this rod is moved downwardly by the back pressure on the upper side of the head 222. This, through the power shift mechanism, shifts the synchronizer from high gear position to low gear position, and simultaneously draws rod 24 upwardly, moving arm 244 upwardly, and thereby raises control rod 237 back to the position shown in Fig. 7. This results in moving member 235 further to the right since, if the load continues, the high vacuum condition produced at the moment of change from high gear to low gear now changes to low vacuum condition. Consequently, the vehicle transmission system has by this time moved through its entire cycle of operations, and is back to a condition of torque multiplication, low gear, low vacuum, as indicated in Fig. 17A, and will operate in this condition until both the vacuum has increased and the oil pressure developed by the speed of the vehicle has increased to a point such as will shift member 235 to the left and piston 217 to the right sufficient to uncover port 220.

Referring now to the showing in Fig. 20, this figures embodies a modified type of fluid control for the automatic shift in the transmission and in the torque converter. In this form of the invention, the shift rod or control rod which is actuated by shifting in the transmission from high gear to low gear is indicated at 260, and is connected through the equalizer bar 262 to the control rod 263 which is shifted in accordance with shifting of the torque converter from torque multiplying position to fluid coupling position.

The equalizer bar has pivotally mounted as at 264 a fulcrum carried by a lever 265 which, at its opposite end, is pivoted as at 266 to a second equalizer bar 267 pivotally mounted as at 268 upon the projecting end 269 of a plunger 270 operating a sleeve type piston 272 carried within a cylinder 273.

The opposite end of the control or equalizer bar 267 is connected through the rod 268 to the engine manifold vacuum control mechanism, and is shiftable from high vacuum to low vacuum position in accordance with the vacuum conditions in the engine intake manifold. These parts are shown in full lines in Fig. 20 as in fluid coupling, high gear and high vacuum position, and would be moved to dotted line position upon starting of the vehicle under load.

A fluid pump is indicated generally at 273', and is driven by the output shaft of the transmission through a drive shaft connection 274 similar to the manner in which the pump in Fig. 5 is driven. The outlet port of the fluid pump is indicated at 275, and leads into the conduit 276 provided with an adjustable leakage port 276' controlled by the screw 277. The fluid pressure from the pump 273 is operable to control various valve mechanisms, which in turn control the flow of fluid under pressure for shifting purposes from the engine pump, which normally is introduced from port 278 into the main control cylinder 279, it being understood that the pressure of the engine fluid pump is sufficient to actuate the various automatic shift mechanisms controlling the transmission shift from low gear to high gear and the shift in the fluid unit.

Mounted in the control cylinder 279 is a plunger member 280 having a collar portion 282 normally closing the port 278. Adjacent each end of the plunger are valve members or collars 283 and 284, the plunger having the extending rod 285 connected to a manually controllable selector for determining forward or reverse drive in the transmission. A pair of relief ports 286 are provided for the cylinder, and adjacent the left hand relief port 286 there is provided a conduit connection 287 leading to the reverse shift cylinder in the power shift mechanism so that when the control rod 285 is moved to the right, fluid under pressure from the port 278 will pass through the cylinder 279 between valve heads 282 and 283 and into the reverse shift cylinder for shifting the reverse gear mechanism in the transmission into mesh.

Similarly, if the control rod 285 is shifted to the left, fluid under pressure from the engine pump will pass from inlet port 278 through cylinder 279 to outlet port 288, and thence through conduit 289 past the valved port 290 and through conduit 292 to the low gear side 293 of a cylinder 294 containing the reciprocal piston rod 295. When the piston receives pressure in the low gear range side 293, it will be moved to the left against the pressure of the gears in the transmission to low gear range. The coil springs 296 and 297, surrounding cylinder 294, function to provide equal bias upon washers 296' and 297' respectively which engage opposite sides of collar 295' of the piston rod. This provides a spring loaded return for biasing the pistons to neutral position. The washers 296' and 297' are interrupted at one point in their periphery to provide a slot allowing for entry of the transmission gear shift fork 298, connected through suitable means to the shifter yoke 159 of Figure 2B. With the mechanism set as indicated in Fig. 20 and the control rod 285 shifted to the left, the engine pump pressure will be effective on the right hand side to shift the transmission into low speed ratio and the vehicle will start moving, the fluid unit under these conditions being in torque multiplying condition.

As the speed of the vehicle increases, the pressure developed by pump 273 will increase correspondingly until such time as it builds up over the leakage available in the leakage port controlled by screw 277. As a result, pressure from this speed controlled pump will pass through conduit 299 into the head end 300 of the piston 273. As indicated in the system of leverages, the mechanism as shown in full lines is in fluid coupling, high gear, high vacuum condition, and normally as the vehicle starts out in low speed, these controls will be moved to the dotted line positions of low gear, low vacuum, torque multiplying condition which moves the plunger 272 to the right to bring the ports 304 and 305 carried thereby into alignment with fluid passageways 306 and 307, respectively. Passageway 306 leads through conduit 308 and conduit 309 to the head end 310 of a plunger 312 mounted for reciprocatory movement in the valve body 313, and having the reduced portion 290 providing the valved passageway from conduit 289 to conduit 292.

As the pressure at the head end 300 of the inner piston sleeve 302 increases, this piston sleeve is moved to the right against the pressure of spring 314 to uncover port 304, allowing fluid under pressure from the speed control pump 205 shown in Figure 5 to pass through port 306 and through conduits 308 and 309 against the head end of piston 312, shifting the piston to the left against the pressure of spring 315. At the same time, fluid pressure through conduit 322 operates to idle the engine by being connected to one side of the throttle control piston in control 34 to push piston rod 35 and the throttle control rod 36 toward idling position to thereby reduce engine torque while gear shifting is produced in the transmission through the synchronizer. This shift of piston 312 closes off the valve passageway between conduits 289 and 292, eliminating pressure on the low speed side of the piston 295, and at the same time opens the passageway 288 to the conduit 316 through the reduced portion 317 of plunger 312. As a result, fluid under engine pump pressure passes from conduit 318 into the chamber 319, or the high gear side of piston 295, shifting the piston 295 to the right to produce a corresponding shift of the transmission shift collar 159 from low gear to high gear. As this shift is made, the vacuum control, consisting of a vacuum responsive member actuating rod 20, and shaft 18, which was in high vacuum position, shifting rod 268 to the dotted line position, changes back to low vacuum position at the same time that control rod 260 changes from low gear position to high gear position, thereby holding piston 272 in position in alignment with port 306.

Port 306 has a leakage control valve 320 and a second conduit 322 leading to one side of the piston in the throttle idling control 34 which, as soon as pressure is introduced through port 304 into port 306, causes the throttle of the engine to move to idling position, thereby reducing the torque on the transmission during the time that the shift from low gear to high gear is effected. As the vehicle increases in speed in the high gear, torque multiplying condition, the vacuum changes from high vacuum to low vacuum, shifting the piston 272 slightly to the left but still in position where the ports 304 communicate with port 306. At the time this gear shift is effected, piston 295 uncovers port 337, which through conduit 338 connected to the opposite side of the piston in throttle control 34, removes the idling control on the engine.

As the vehicle speed increases, more pressure is supplied against the head end of inner sleeve 302, moving this sleeve still further to the right to uncover port 305 and admit fluid under pressure through port 307 and conduit 323 to the head end 324 of piston 325. As a result, piston 325 is shifted to the left against the pressure of spring 326 to align the conduit 316 with the conduit 327 through the reduced portion 328 of the piston 325. This allows fluid under pressure to pass through conduit 327 and conduit 329 into the head end 330 of a cylinder 332 carrying the piston 333 having a control rod 334 connected to the shift mechanism for shifting the torque converter clutch 111 or 111' into a fluid coupling condition. At this time, the control rod 263, responsive to this action of fluid unit shift lever 32, operates through rod 28 and shaft 26 to shift from torque multiplying to fluid coupling position, but at the same time the vacuum control shifts from high vacuum to low vacuum, thereby maintaining the piston 272 in substantially the same position. As the speed of the vehicle further increases, the vacuum finally reaches a high vacuum condition, and due to the high speed of the pump 273, both ports 304 and 305 remain uncovered with the inner sleeve 302 moved so far to the right as to maintain adequate fluid pressure on the right hand ends of both pistons 312 and 325.

It should be pointed out that in shifting from low gear to high gear position, the initial shift produced introduced fluid pressure in conduit 322, which, through the throttle control 34 and rod 36, shifts the throttle to idling position to allow the shift to be made without opposing the full torque of the engine. As soon as the piston 295 has moved to the right sufficiently to accomplish the shift, however, a portion of the fluid in the chamber 319 is bypassed through passageway 337 and conduit 338 to the opposite side of the control member 34 which returns the throttle idling control piston to a position for driving operations so that the throttle is restored to operative position as the shift into high gear is completed.

Assuming now that the mechanism is in a position with both plungers 312 and 325 shifted to the left and with inner sleeve 302 of cylinder 273 shifted to the right sufficiently to maintain ports 304 and 305 uncovered, the vehicle will operate in a cruising drive of high gear, fluid coupling, high vacuum condition.

As increasing load is put upon the vehicle due to encountering a grade or the like, the speed control pump 273 will reduce its pressure and at the same time, the high vacuum control rod 268 will shift to low vacuum condition, which produces counter movement of piston 272 and inner sleeve 302, resulting in the head end of sleeve 302 moving past port 305 to close off this port against pressure from conduit 299, whereby the pressure in the conduit 323 is relieved by being exhausted through port 339 in the inner sleeve 302. As a result, spring 326 moves piston 325 to the right, closing off communication between conduits 316 and 327, and consequently shutting off pressure to the head end of cylinder 332. The spring 340 of the fluid clutch shift unit, then moves piston 333 to the left, and the pressure in conduit 327 is relieved through the vent 342, restoring the fluid clutch to a torque multiplying position. At the same time, the vacuum changes from low vacuum to high vacuum, while the control rod 263 moves from the fluid coupling position to a torque multiplying position. This, in turn, effects a slight movement to the right of piston 272 at the same time that the pressure developed by the pump 273 is reduced due to lowering of speed. As a result, inner sleeve 302 moves to the left, closing off the speed control pump pressure to port 304. This cuts off pressure to the head end 310 of plunger 312, and the plunger returns by means of the spring 315 to the position shown in Fig. 20.

This changes the pressure of the engine pump from the left hand side of piston 295 to the right, whereby the shift collar 159 is actuated to shift the transmission from high gear range to low gear range. The pressure in conduit 318 is relieved through vent 343 under these conditions. The vehicle is then operating in a condition of low gear, torque multiplying and high vacuum, with the ports 304 and 305 closed against the fluid pressure by the pump 273. If still further load is encountered, the control rod 268 moves to low vacuum condition, and the vehicle continues to operate under a condition of torque multiplication and low gear. As the vehicle again picks up speed the cycle of operation previously described occurs, shifting the transmission from low gear to high gear range and then shifting the torque multiplier to a fluid coupling condition until a cruising speed range is produced. The relief valve 345 in conduit 299 is provided in cases where the vehicle is going at such a speed that more pressure is developed by the speed control pump 273 than is necessary to maintain inner sleeve 302 in its furthermost position away from piston 272. This provides a safety relief for preventing the development of too much pressure.

It is therefore believed apparent that I have provided a completely automatic transmission in which, after the operator selects the direction of drive, all further changes in torque multiplication and gear ratios will be produced automatically through a combination of automatic shifting mechanisms for the transmission gears and for the torque converter controlled partly by pressure developed as a function of the speed of the output shaft of the transmission and partly by load as sensed by engine manifold vacuum. The actual shifting is produced automatically by fluid under pressure from an engine pump which controls shifting pistons, which in turn operate the respective shift mechanisms. In this connection, in shifting from low gear to high gear position, means is provided for momentarily idling the throttle of the engine to accommodate this shift, completion of the shift returning the throttle to control the operation of the vehicle.

In addition, I have provided a novel type of clutch arrangement operable to shift the torque converter from torque multiplying position to fluid coupling position and controlled automatically through fluid means. The particular details of the clutch construction and its operation are believed novel, as well as the control means for shifting the same.

In the transmission itself, there is provided a novel type of synchronizing mechanism which allows shifting of the gears in the transmission from one speed range to the other without declutching the torque converter or the engine, thus eliminating the use of a positive friction clutch. Further, this synchronizing mechanism insures that there will be no intermediate pause during the shifting movement, and it facilitates automatic shifting in that the engine torque or coasting torque, as the case may be, actually assists in the declutching from the one speed range and the clutching into the selected speed range.

It is to be understood that numerous changes may be made in certain details of the present invention without in any way departing from the underlying principles which I have embodied in the illustrated embodiments of the invention. I therefore do not intend to be limited except as defined by the scope and spirit of the appended claims.

I claim:

1. In a transmission, a fluid unit including a stator and a rotor, a shaft driven by said rotor, change speed gearing, an output shaft driven by said shaft through said gearing, synchronizer means for coupling said shafts for direct drive therebetween, a brake mechanism, a clutch operative to clutch said stator to said first-named shaft to change said unit into a fluid coupling, and actuating means operable in one direction from a neutral position to engage said clutch and operable in the other direction to actuate said brake mechanism for holding said first-named shaft against rotation caused by idling torque of said fluid unit.

2. In a vehicle having an engine and a transmission having a fluid torque converter and a change speed transmission, means for shifting said converter to a two-element fluid coupling, means for shifting said transmission from low gear range to high gear range, an element responsive to manifold pressure variations in said engine, a vehicle speed responsive element, automatic means responsive to load and speed conditions as sensed by said elements for actuating said gear shifting means as the speed increases and vacuum increases through a first predetermined speed range and for thereafter actuating said converter shifting means as the speed increases and vacuum increases through a second higher speed range.

3. The transmission of claim 2 wherein said speed responsive element includes a fluid pump operating as a direct function of vehicle speed.

4. The transmission of claim 2 wherein said speed responsive means includes a fluid pressure developing device and said automatic means includes piston means responsive to said pressure, and valve means jointly controlled by said shifting means and said engine vacuum.

5. In a vehicle, a transmission including a torque converter and a gear transmission having a low and a high gear ratio, means for changing said torque converter to a fluid coupling, means for shifting said transmission from low to high gear ratio, means for developing fluid pressure as a function of the speed of the vehicle, means responsive to load on said transmission, and pressure responsive means controlled automatically by said speed and load responsive means for automatically actuating said shifting means and said converter changing means to accommodate varying conditions of speed and load encountered by said vehicle.

6. In a power driven vehicle, a transmission comprising a torque converter and a change speed gear box, an output shaft from said gear box, a pump driven thereby and developing a pressure directly proportional to the speed of the vehicle, a control mechanism including a piston subject to said pressure, ports in said mechanism respectively controlled by successive movement of said piston in one direction, actuating means responsive to opening of one of said ports for shifting from low to high gear ratio in said box, actuating means responsive to opening of the next succeeding port for changing said torque converter to a fluid coupling, said ports being formed in a sliding member, and means responsive to engine intake manifold vacuum for shifting said last-named member independently of said pump pressure whereby control of said actuating means is a conjoint function of vehicle load and speed.

7. In an automatic transmission control mechanism for a vehicle having an engine, a fluid unit, and a transmission coupled together for driving said vehicle, said fluid unit having a torque multiplying position and a fluid coupling position, means for shifting said unit from one position to the other, said transmission having a low gear range and a higher gear range, means for shifting said transmission from one range to the other, and fluid pressure controlled means responsive to both vehicle speed and to engine intake manifold vacuum for selectively controlling said shifting means.

8. The control mechanism of claim 7 wherein said speed responsive means includes a fluid pump driven by the output shaft of said transmission, a valve assembly including a pair of shift actuating pistons, ports in said assembly for conducting fluid under pressure to said pistons, a sliding piston moved by the pump fluid pressure for controlling said ports, and means controlled by the vacuum responsive means for shifting said ports relative to said sliding piston whereby said mechanism functions in accordance with joint control of said shift actuating pistons by said speed and vacuum responsive means.

9. The control mechanism of claim 7 wherein said fluid pressure controlled means includes a valve assembly comprising a sliding member having ports therein, a piston responsive to fluid pressure developed as a direct function of vehicle speed and movable to uncover said ports, and means for shifting said sliding member to vary the position of said ports responsive to said engine vacuum.

10. In an automatic control system for a vehicle having an engine, fluid unit and transmission for driving said vehicle, automatic means for shifting said fluid unit selectively to torque multiplying or fluid coupling position, automatic means for shifting said transmission selectively to lower or higher gear ratio, a first fluid pressure developing system driven by said engine for actuating said automatic means, and a second fluid system operating to develop fluid pressure as a direct function of vehicle speed and including vacuum responsive means for selectively controlling the operation of said first fluid system.

11. The control system of claim 10 including means in said second fluid system for momentarily idling said engine and operative only during actuation of said transmission shift means from lower gear to higher gear ratio.

12. The control system of claim 10 further characterized in the provision of a compound linkage system responsive to engine vacuum and actuation of said shift means for varying the ranges of operation of said second fluid system.

13. The control system of claim 10 wherein said second fluid system includes a piston movable in accordance with pressures developed as a direct function of the speed of the vehicle, a ported control member movable solely in accordance with engine vacuum and the positions of said shifting means, said piston selectively controlling the opening and closing of the ports in said member, and means responsive to opening and closing of said ports for selectively actuating said shifting means.

14. In a vehicle having a transmission, an automatic transmission control comprising a pump developing fluid pressure as a direct function of vehicle speed, a piston normally biased in one direction and selectively moved in the opposite direction by said fluid pressure, a sliding valve having spaced ports, a leverage system for adjusting said valve into various positions depending upon engine vacuum and the ratio in the transmission, said piston being operative under a predetermined pressure to open one of said ports only when said valve is in one of its adjusted positions indicating a high vacuum, automatic shift means operable upon opening of said port to shift from a lower gear ratio to a higher gear ratio, and means in said leverage system for holding said valve in said adjusted position upon completion of said shift even though engine vacuum drops to a low vacuum condition.

15. The control system of claim 14 wherein said piston operates to open a second port in said valve under a higher predetermined pressure and a second adjusted position of said valve caused by movement of said leverage system as the engine vacuum reaches high vacuum condition, a torque converter in said transmission, and means operative upon opening of said second port to shift said converter into a fluid coupling.

16. The control system of claim 14 wherein said piston operates to open a second port in said valve under a higher predetermined pressure and a second adjusted position of said valve caused by movement of said leverage system as the engine vacuum reaches high vacuum condition, a torque converter in said transmission, means operative upon opening of said second port to shift said converter into a fluid coupling, and means in said leverage system responsive to completion of said last-named shift for holding said valve in said second adjusted position as engine vacuum drops to low vacuum condition only if said pressure remains at or above said higher predetermined pressure.

17. The control system of claim 14 including means responsive to initial opening of said port for idling the vehicle engine, and means responsive to completion of said shift for cutting out said idling means.

18. In a vehicle having an engine, a fluid unit and a change speed gear unit, automatic means for shifting said fluid unit from torque multiplying condition to fluid coupling condition, automatic means for shifting said gear unit from one gear ratio to another, a fluid power system for actuating each of said shifting means, and a fluid control system responsive to load on said engine and to the speed of said vehicle for selectively controlling operation of said fluid power system.

19. The vehicle of claim 18 wherein said fluid control system includes a sliding piston operating under fluid pressure, and a sliding valve having ports adapted to be controlled by said piston, said ports in turn controlling selective operation of said fluid power system.

20. The vehicle of claim 18 wherein said fluid control system includes a sliding piston operating under fluid pressure, and a sliding valve having ports adapted to be controlled by said piston, said ports in turn controlling selective operation of said fluid power system, and leverage means controlled in part by engine vacuum conditions and in part by the positions of said shifting means for adjusting the position of said valve.

21. In a vehicle provided with an engine, a fluid torque converter and a change speed transmission, manually operated engine accelerator means, means for selecting the direction of drive through said transmission, shift means in said transmission normally in low speed position, depression of said accelerator means causing movement of said vehicle in the selected direction, means automatically responsive to predetermined vehicle speed and engine load for actuating said shift means toward high speed position, automatically operable means responsive to initial actuation of said shift means for idling said engine independently of the position of said accelerator means, to condition said transmission for shifting, and means responsive to complete actuation of said shift means into high speed position for restoring control of said engine to said accelerator means, said automatic responsive means being provided with means operable upon further increase in vehicle speed and decrease in engine load for again causing actuation of said automatically operable idling means, and including means for shifting said torque converter into a position whereby said converter functions as a fluid coupling.

ROBERT LAPSLEY.

REFERENCES CITED

The following references are of record in the file of this patent:

UNITED STATES PATENTS

| Number | Name | Date |
|---|---|---|
| 1,929,185 | Ferris | Oct. 3, 1933 |
| 1,970,236 | Kluge | Aug. 14, 1934 |
| 2,014,944 | Martyrer et al. | Sept. 17, 1935 |
| 2,104,608 | Cox et al. | Jan. 4, 1938 |
| 2,202,271 | Sinclair et al. | May 28, 1940 |
| 2,203,177 | Patterson | June 4, 1940 |
| 2,245,017 | Sinclair | June 10, 1941 |
| 2,266,598 | Hale | Dec. 16, 1941 |
| 2,298,648 | Russell | Oct. 13, 1942 |
| 2,298,649 | Russell | Oct. 13, 1942 |
| 2,302,714 | Pollard | Nov. 24, 1942 |
| 2,303,829 | Dodge | Dec. 1, 1942 |
| 2,322,479 | Schjolin | June 22, 1943 |
| 2,323,202 | Christian | June 29, 1943 |
| 2,327,214 | Pollard | Aug. 17, 1943 |
| 2,343,304 | La Brie | Mar. 7, 1944 |

FOREIGN PATENTS

| Number | Country | Date |
|---|---|---|
| 496,299 | Great Britain | Nov. 29, 1938 |